United States Patent
Bramlage et al.

(10) Patent No.: US 7,970,699 B1
(45) Date of Patent: Jun. 28, 2011

(54) CUSTOMIZED CONSUMER LOAN SEARCH AND OPTIMIZED LOAN PRICING

(75) Inventors: William Bramlage, Cincinnati, OH (US); Jonathan Strike, San Francisco, CA (US)

(73) Assignee: Loan Insights, Inc., San Francisco, CA (US)

( * ) Notice: Subject to any disclaimer, the term of this patent is extended or adjusted under 35 U.S.C. 154(b) by 1422 days.

(21) Appl. No.: 11/390,805

(22) Filed: Mar. 27, 2006

(51) Int. Cl.
*G06Q 40/00* (2006.01)

(52) U.S. Cl. ............................. 705/38; 705/30

(58) Field of Classification Search ............... 705/10–44
See application file for complete search history.

(56) References Cited

U.S. PATENT DOCUMENTS

| | | | |
|---|---|---|---|
| 5,940,812 A * | 8/1999 | Tengel et al. ............. | 705/38 |
| 6,233,566 B1 | 5/2001 | Levine | |
| 6,385,594 B1 | 5/2002 | Lebda et al. | |
| 6,611,816 B2 | 8/2003 | Lebda et al. | |
| 6,963,899 B1 | 11/2005 | Fernandez et al. | |
| 7,366,694 B2 | 4/2008 | Lazerson | |
| 2002/0077970 A1 | 6/2002 | Lebda | |
| 2002/0116312 A1 | 8/2002 | Talbot | |
| 2003/0036995 A1 | 2/2003 | Lazerson | |
| 2004/0030639 A1 | 2/2004 | Lebda | |
| 2004/0034592 A1 | 2/2004 | Hu | |
| 2004/0205019 A1 | 10/2004 | Painter | |
| 2005/0283389 A1 | 12/2005 | Widjaja | |

OTHER PUBLICATIONS

Amerisave, "Amerisave Launches New Website." Aug. 25, 2005 www.amerisave.com/aboutus/press20050825.cfm.
Rick Grant, Amerisave, "Amerisave's New Retail Site; How would you build it if you could start from scratch, taking advantage of all the technology currently available?" Jan. 2, 2004, www.amerisave.com/aboutus/new20040102.cfm.
"Amerisave delivers the subprime borrower into the web.", Mortgage Techonology, Jan. 2005, Thompson Media, New York, NY, U.S.A.
U.S. Appl. No. 12/173,226, filed Jul. 15, 2008, Bramlage et al.
Ferris, F. "Load & Lock: Amerisave delivers the subprime borrower into the Web." Mortage Technology (Jan. 2005).
"Case Study: The Money Store." New York Loan Exchange [online], Sep. 2008 [retrieved on Oct. 14, 2009].
Retrieved from the Internet: <http://www.nylx.com/mainsitepdf/NYLX-TheMoneyStore-CaseStudy.pdf>.

* cited by examiner

*Primary Examiner* — Frantzy Poinvil
(74) *Attorney, Agent, or Firm* — Fernandez & Assoc. LLP

(57) ABSTRACT

The invention relates to methods that create and update a centralized and searchable database of lenders' underwriting and pricing guidelines that can be utilized by the consumer and to a system that matches the consumer's qualifications and needs to the best available loan products with associated rate pricing.

12 Claims, 14 Drawing Sheets

Creation of Loan Broker Lender Database

Loan Broker Computing Apparatus

Lender Server

Customer Device

Credit Bureau or Alternative
Data Server or Device

Loan Broker Server

Credit Related Fields

- Credit score requirements
- Tradeline requirements
- Payment history
- Bankruptcy history
- Foreclosure history
- Notice of Default history

Alternative Embodiments:
- Highest credit limit
- Years of credit on file
- Age of credit report
- Delinquent Accounts
- Collections
- Credit report requirements
- Chargeoffs
- Judgments
- Non-traditional credit
- Rental history

Credit Related Fields

- Property type requirements
- Occupancy type requirements
- Location

Alternative Embodiments:
- Seasoning
- Acreage
- Square footage
- Total # of properties owned by borrower
- Total # of units owned by borrower
- Length of property for sale on the market
- Seller's length of property ownership
- Requirements for properties held in trust
- Liens on property (including mortgages)

Loan/Transaction Related Fields

- Loan Amount
- Use of Proceeds
- Lien Position
- Cash-Out Amount
- Loan to Value (LTV)
- Combined Loan to Value (CLTV)
- Product Terms
- Interest Only versus Full Amortizing

Alternative Embodiments:
- Yield Spread parameters
- Rate Buy-Down
- Pre-payment penalty requirements
- Lock Terms
- Escrow requirements
- Insurance requirements
- 1031 Exchange
- Seller concessions
- Gift fund requirements
- Owner/Builder loan requirements
- Construction loan requirements
- Financing concessions

Employment/Income/Expense Related Fields

- Front Debt-to-Income ratio
- Back Debt-to-Income ratio
- PITI Reserve requirements
- Type of Documentation
- Employment Type

Alternative Embodiments:
- Additional documentation
- Payment shock
- Income requirements
- Expense requirements
- Asset requirements
- Disposable Income Requirements
- Reserve requirements
- Time in current job
- Time in current industry
- Time in current career
- Requirements for trailing spousal income
- Requirements for trailing secondary earner's income FIG. 6
Representative Fields Within the Loan Broker Lender Database Creation of
Consumer Profile Creation of
Loan Broker
Lender Database Process Flow Logic

Results Summary

3 year ARM, Fully Amortizing, Single Mortgage

| Lender | Loan Term: | Interest Rate | Monthly Payment | "Points" | APR |
|---|---|---|---|---|---|
| Bank of America | 3 year ARM | 4.00% | $954.83 | $0.0 | 4.12% |
| IndyMac | 3 year ARM | 4.10% | $966.40 | $0.0 | 4.22% |
| Wells Fargo | 3 year ARM | 4.25% | $983.88 | $0.0 | 4.37% |
| GreenPoint Mortgage | 3 year ARM | 4.50% | $1,013.37 | $0.0 | 4.62% |
| CountryWide | 3 year ARM | 4.65% | $1,031.27 | $0.0 | 4.77% |

3 year ARM, Fully Amortizing, Multiple Mortgages

| Lender | Loan Term: | Interest Rate | Monthly Payment | "Points" | APR |
|---|---|---|---|---|---|
| 1st Mortgage - $160,000: Bank of America<br>2nd Mortgage - $40,000: Bank of America | 3 year ARM | 3.85% | $937.62 | $0.0 | 3.97% |
| 1st Mortgage - $160,000: IndyMac<br>2nd Mortgage - $40,000: Greenpoint | 3 year ARM | 3.90% | $943.34 | $0.0 | 4.02% |
| 1st Mortgage - $160,000: Saxon Mortgage<br>2nd Mortgage - $40,000: Oak Street Mortgage | 3 year ARM | 4.00% | $954.83 | $0.0 | 4.12% |
| 1st Mortgage - $160,000: Wells Fargo<br>2nd Mortgage - $40,000: Wells Fargo | 3 year ARM | 4.15% | $972.21 | $0.0 | 4.27% |
| 1st Mortgage - $160,000: Provident Funding<br>2nd Mortgage - $40,000: CreveCor Mortgage | 3 year ARM | 4.25% | $983.88 | $0.0 | 4.37% |

5 year ARM, Interest Only

| Lender | Loan Term: | Interest Rate | Monthly Payment | "Points" | APR |
|---|---|---|---|---|---|
| CreveCor Mortgage | 5 year ARM | 5.00% | $1,073.64 | $0.0 | 5.13% |
| Fremont Investment and Loan | 5 year ARM | 5.10% | $1,085.90 | $0.0 | 5.23% |
| Decision One Mortgage | 5 year ARM | 5.25% | $1,104.41 | $0.0 | 5.38% |
| Oak Street Mortgage | 5 year ARM | 5.50% | $1,135.58 | $0.0 | 5.63% |
| Provident Funding | 5 year ARM | 5.65% | $1,154.47 | $0.0 | 5.78% |

FIG. 10A
Representative Example of Consumer Output

30 year Fixed, Fully Amortizing

| Lender | Loan Type: | Interest Rate | Monthly Payment | "Points" | APR |
|---|---|---|---|---|---|
| LIME Financial | 30 year Fixed | 6.00% | $1,199.10 | $0.0 | 6.13% |
| Option One Mortgage | 30 year Fixed | 6.10% | $1,211.99 | $0.0 | 6.23% |
| Tri-Lending Group | 30 year Fixed | 6.25% | $1,231.43 | $0.0 | 6.39% |
| Aegis Funding | 30 year Fixed | 6.50% | $1,264.14 | $0.0 | 6.64% |
| Saxon Mortgage | 30 year Fixed | 6.65% | $1,283.93 | $0.0 | 6.79% |

FIG. 10B – part1    Representative Example of Consumer Output

Your Profile Assumptions:

| | |
|---|---|
| Property Type | Single Family Home |
| Property Location | Ohio |
| Occupancy Type | Owner Occupied |
| Use of Proceeds | Purchase |
| Property Value | $200,000 |
| Down Payment | $0 |
| Total Loan Amount | $200,000 |
| Cash-Out Amount | $0 |
| Loan to Value (LTV) | 100% |
| Combined Loan to Value (CLTV) | 100% |
| Credit Score | 700 |
| Documentation Type | Full Documentation |
| Income | $100,000 |
| Monthly Expenses (excluding housing costs) | $2,000 |
| Total Reserves (Liquid Assets) | $150,000 |
| # of late mortgage payments: | |
| 30 day lates | 0 |
| 60 day lates | 0 |
| 90 day lates | 0 |
| 120 day lates | 0 |
| Months since Chp 7 bankruptcy | NA |
| Months since Chp 13 bankruptcy | NA |
| Months since Consumer Credit Counseling | NA |
| Months since Foreclosure or NOD | NA |
| Seasoning on Property | Null |
| Total # other Properties Owned | 0 |
| Acreage | Null |
| Square Footage | Null |

FIG. 10B – part2    Representative Example of Consumer Output

Legal Disclaimer

"APR" is calculated using the Interest Rate and your estimated loan related closing costs according to the requirements of Regulation Z in the Truth in Lending Act. Estimated loan related closing costs assume LoanInsights' best estimate for costs related to Loan Origination Fees, Discount Fees ("Points"), Tax Service Fees, Loan Processing Fees, Underwriting Fees, Wire Transfer Fees, Escrow Fees, Document Preparation Fee, Courier Fees, Endorsement Fees, and costs related to Mortgage Insurance. Most of these estimates are ranges, and LoanInsights uses the lower end of the range in the estimates and APR calculation.

The products, terms, interest rates, APR, and any and all information provided and presented by LoanInsights is subject to change without notice. LoanInsights collects data and information from our lending partners and the information we provide is up to date to the best of our knowledge. We make no guarantees as to the accuracy of the information we provide on or through our website.

The information provided herein is for informational and educational purposes only, and does not represent a commitment or offer to lend. LoanInsights is not a lender, and we have no control or authority over the lenders' ultimate decision(s) whether or not to extend credit. Under no circumstances does any of the information presented by LoanInsights or through LoanInsights.com represent a commitment to lend on any of the terms advertised or presented, by LoanInsights, or on the LoanInsights.com website. Your loan may or may not be approved on the advertised terms provided by the lenders. The lenders in our network, not LoanInsights, will ultimately determine whether or not your loan application is approved, and the lenders, not LoanInsights, would be funding your loan.

We do not guarantee that you will be able to obtain a loan.

FIG. 10C Representative Example of Consumer Output

Closing Costs and Good Faith Estimate

| | Estimated Costs | Included in APR? |
|---|---:|:---:|
| Items Payable in Connection with Loan | | |
| Loan Origination Fee | $2,000 | Yes |
| Mortgage Broker Fee | $0 | Yes |
| Loan Discount Fee ("Points") | $0 | Yes |
| Appraisal Fee | $250 - $300 | No |
| Credit Report Fee | $10 - $20 | No |
| Tax Service Fee | $50 - $150 | Yes |
| Loan Processing Fee | $300 | Yes |
| Underwriting Fee or Lender Inspection Fee | $250 - $1,000 | Yes |
| Wire Transfer Fee | $20 - $25 | Yes |
| Yield Spread premium/rebate | Typically $0 | No |
| Title Charges: | | |
| Closing or Escrow Fee | $100 - $400 | Yes |
| Document Preparation Fee | $50 - $250 | Yes |
| Notary Fees | Variable | No |
| Attorney Fees | $50 - $150 | No |
| Title Insurance | $787.50 | No |
| Title Exam Search | $75 - $200 | No |
| Government Recording & Transfer Charges: | | |
| Recording Fees | Charged by County | No |
| City/County Tax/ Stamps | Depends on City/county/state | No |
| State Tax/Stamps | Depends on City/county/state | No |
| Additional Settlement Charges: | | |
| Pest Inspection | $35-$45 | No |
| Flood Certificate | $10 - $20 | No |
| Courier Fee | $30 | Yes |
| Endorsement Fees | $75 - $150 | Yes |
| Binder Fee | $50 | No |
| Items Required by Lender to Be Paid in Advance: | | |
| Pro-Rated Interest | Variable, depends on when loan closes | No |
| Private Mortgage Insurance Premium (PMI) | $0 – $1,000 | Yes |
| Hazard Insurance Premium | Variable | No |
| VA Funding Fee | Variable | No |
| Reserves Deposited with Lender: | | |
| Hazard Insurance Premium | Variable | No |
| Mortgage Insurance Premium Reserve | Variable | Yes |
| School Tax | Variable | No |
| Tax and Assessment Reserves | Variable | No |
| Flood Insurance Reserves | Variable | No |

FIG. 10D
Representative Example of Consumer Output

CUSTOMIZED CONSUMER LOAN SEARCH AND OPTIMIZED LOAN PRICING

FIELD OF INVENTION

The present invention relates generally to computer networks, and more specifically, to a system and method to interface (web-based or otherwise) between consumers and lenders using software for database management and searching as well as matching of specific parameters.

BACKGROUND OF INVENTION

Computers have revolutionized the ways by which loans are provided to customers. With the advent of the Internet, there have been even more substantial technological advancements in the mortgage and financial services industries. The Internet initially created an additional distribution channel for loan searching and origination generally through the use of application service providers. These entities developed software to facilitate online interaction between a singular lender and an individual consumer, thereby creating another revolution. There are still a large number of $3^{rd}$-party software companies that do work on the back end for large banks and commercial lending institutions to streamline their customers' back end operations and increase overall efficiencies. In addition, most lenders now have their own proprietary systems that can price a loan for a specific loan profile but only for that lending institution's own set of proprietary products. This limits the ability of a consumer to conveniently search for all loan products for which they may be qualified and to find the loan product with the best available rates.

Direct commercial lenders have come into existence whereby they offer a limited search and application process for consumers to wholesale lenders; however, the search methodology is poor and the search criteria is limited to the point that any loan search and pricing is generic and not fully customized to a consumer's profiled requests and needs. To improve on this concept, online lead generators have attempted to alleviate a consumer's pain by receiving consumer information, filtering that information toward pre-approved loans offered by lenders that are closely associated with the online lead generator, and selling the consumer information to brokers and/or lenders for future consumer contact. One of the many problems with this approach is that loan product rates are not a component of the limited search criteria, and the consumer is unlikely to receive the best rate.

In addition to their traditional presence, loan brokers eventually reintroduced themselves to the online loan process as an intermediary by creating broker software. This way, a loan broker could interact with a finite number of lenders, thereby providing the actual borrower with more choices. The broker's software functions to provide mortgage brokers and other professionals with limited information on lenders, the types of products they offer, and ideally the pricing of said products, but it does not function to inform the borrower especially as that information relates to removing confusion regarding closing costs, fees, and yield spread which are all additional costs to the consumer. Unfortunately such broker software also prevents the borrower, the true consumer, from accessing critical information directly and introduces an inefficient if not unnecessary level of contact and adds cost to the lending, underwriting, and pricing process.

Finally, an online mortgage origination industry has also come into existence whereby loan products and pricing of multiple wholesale lenders are aggregated. Once applicable loan rates and pricing are determined for a consumer, that consumer's information can be passed along to an online loan origination system to begin the actual loan application process. However, the consumer would not be certain of their qualification for a loan product until they entered the loan application process. And furthermore, without a centralized and searchable database of the lenders' underwriting and pricing guidelines, the consumer can not be certain that the loan product chosen for them is the best product for their needs even if they did qualify.

To this day, the mortgage process remains fragmented and opaque wherein a consumer is unable to know for certain if they can obtain or have received the loan that best meets their needs. The use of existing technology and a traditional loan broker does not solve the problems because the broker also lacks the tools to confirm that he is getting the 'best' loan for the represented consumer. There is currently no way that a consumer can match his qualifications and needs to the best available loan products and determine the associated rate pricing, monthly payments, and fees of those products.

SUMMARY OF INVENTION

In light of the foregoing, a need in the art exists for methods that create a centralized and searchable database of lenders' underwriting and interest rate pricing guidelines that can be utilized by the consumer and for a system that matches the consumer's qualifications and needs to the best available loan products with associated rate pricing. The consumer must directly search lenders to ensure that s/he obtains the loan that comes closest to matching the desired criteria and further avoids the broker process and associated fees. Embodiments of the present invention substantially fulfill this need.

In an embodiment of the present invention a computer automated method for creating, organizing, and updating a centralized and searchable database of a plurality of lending institutions' underwriting and interest rate pricing guidelines for loan products is utilized to search for the optimal loan products available. The method comprises the steps of receiving a first lender subset database and receiving a second lender subset database, modifying one or more subset databases with a minimum compliance level of data, and storing all subset database information in the loan broker lender database such that matching and optimization of loan products or pricing for a consumer may be performed. The first subset database and all subsequent lender subset databases are comprised of at least a minimum compliance level of data including the following lending institution underwriting and pricing guidelines: loan characteristics, qualifying ratios and limits, base rate pricing, yield spread rate pricing (also known as service release premium pricing or gain on sale pricing), and rate add-ons.

The first lender subset database and one or more subsequent lender subset databases are received and updated automatically or manually by contacting a plurality of lending institutions via the Internet or other means of data transfer as further described below. Additionally, a first lender subset database and one or more subsequent lender subset databases could be received automatically by a plurality of lending institutions updating a centralized web server via the Internet and contributing a lending institution's subset database of underwriting and pricing guidelines to the loan broker lender database.

The first lender subset database and all subsequent lender subset databases are organized into a numerical loan broker subset databases matrix functioning as limits with the resulting data comprising the minimum compliance level of data. Programming logic can then match the best available loan products with associated rate pricing to the consumer's qualifications and needs found in the consumer profile described below.

A method of interfacing a customer computer or device to an additional computer or device through a network interface for searching a loan broker lender database comprising a plurality of lending institutions' underwriting and pricing guidelines on behalf of a customer is utilized to search and qualify for, rank, and present the optimal loan products available. The method comprises the steps of receiving and storing consumer information within the additional computer or device, performing one or more calculations including use of the consumer information to obtain credit related values, and creating a consumer profile comprising consumer information and the results of credit related value calculations.

The consumer information comprises loan and property information including use of proceeds, property value, loan amount, down payment, cash-out amount, property location, property type, occupancy type, terms, length of loan, interest only loan or otherwise, length of property ownership, total number of properties owned, acreage, or square footage. The consumer information also comprises income information including type of income documentation, income, expenses, value of liquid assets, property taxes, insurance cost, or employment information. The consumer information also comprises credit information including credit score(s), credit self-ranking, tradelines, payment history, bankruptcy history, consumer credit counseling history, or foreclosure or notice of default (NOD) history. The credit information may be received automatically by a centralized web server via the Internet.

Credit related value calculations performed by the additional computer or device comprise loan-to-value ratio (LTV), combined loan-to-value ratio (CLTV), front debt-to-income ratio (DTI), back DTI, disposable income, total tradelines, principal, interest, property taxes, and insurance (PITI) reserves, number of late payments, time since bankruptcy, time since consumer credit counseling, or time since foreclosure or notice of default.

In an embodiment of the present invention a consumer is able to receive a ranking of available loan products presented according to interest rate, monthly payment, and/or Annual Percentage Rate (APR), or other output in an interactive interface. A computer-accessible medium having encoded thereon instructions to present a consumer with the available loan products with associated pricing is utilized, wherein the instructions, when executed by a computing apparatus, cause the computing apparatus to compare the consumer profile to existing lender guideline criteria located in the loan broker lender database, reject lenders that will not offer loan products to the consumer, compare the consumer profile to available lender loan products, obtain a number of available loan products, determine or calculate corresponding base rate or yield spread rate (also known as service release premium rate or gain on sale rate) for the available loan products, and apply rate add-ons to determine or calculate lender rates for the loan products.

The instructions contained within the programming logic further automatically determine or calculate a plurality of lending institutions' criteria to combine and optimize product selection according to the consumer profile to include multiple weighted products from different lending institutions. The instructions further automatically determine or calculate consumer output criteria comprising lenders, loan products, rates, monthly payment totals, Annual Percentage Rate (APR), or a portion of the consumer profile, and the instructions further automatically determine or calculate consumer output criteria comprising title insurance cost, or other closing costs and fees. Once a consumer receives a ranking of available loan products presented from a least expensive rate and monthly payment to a most expensive rate and monthly payment or other output in an interactive interface, the instructions further allow the consumer to modify their existing consumer profile to obtain alternative lending institutions' product rankings based on alternative search criteria. Additionally, the instructions further allow a consumer to initiate or complete a transaction for one or more of the loan products as presented in the consumer output.

Other aspects and features of various embodiments disclosed herein will become apparent from consideration of the following description taken in conjunction with the accompanying drawings.

BRIEF DESCRIPTION OF DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

FIG. 6 shows a representation of the loan broker lender database in accordance with an embodiment of the present invention;

FIG. 10 shows a representative example of a consumer output in accordance with an embodiment of the present invention;

DETAILED DESCRIPTION OF EMBODIMENTS

Figure 1:
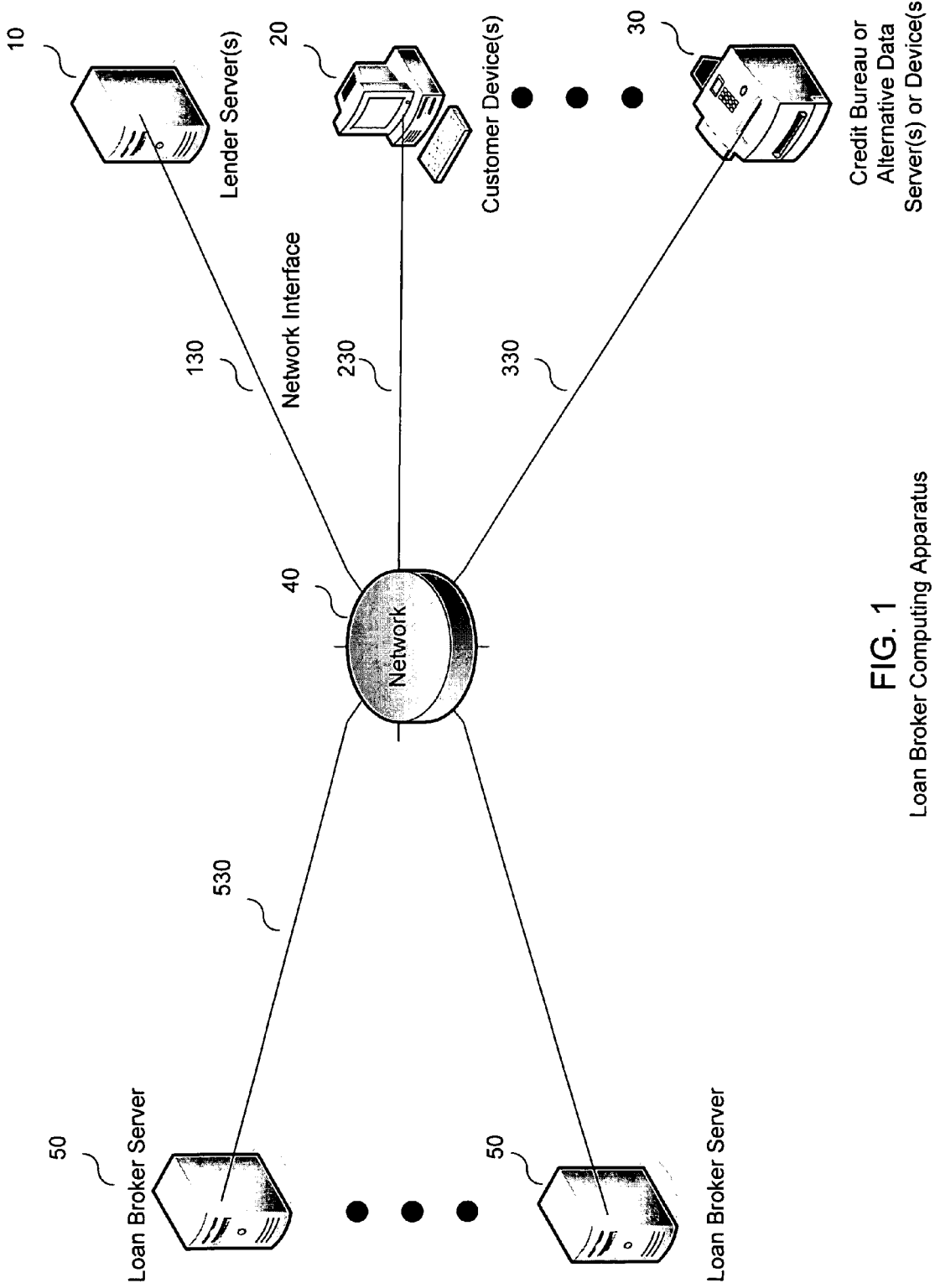
FIG. 1 shows a block diagram of a loan broker computing apparatus implementing the present invention.

The following terms have these corresponding definitions in the description:

AVAILABLE LOAN PRODUCT: A loan that a lender generally offers and will offer to a potential consumer when the given attributes of that consumer satisfy the loan acceptance criteria.

BEST AVAILABLE LOAN PRODUCT: An available loan product or combination of loan products selected by the programming logic and presented to the potential consumer as possessing the best (i.e., most favorable or desirable to the consumer based upon their custom consumer profile) attribute or combination of attributes relative to all other available loan products.

CONSUMER PROFILE: Information about a consumer based on (1) input provided by the consumer or from alternative sources about the consumer and the loan type(s) they are seeking such as income and asset information, use of proceeds including, for example, value and additional information about a property they may be buying or refinancing, amount of loan, and credit information and (2) calculations and programming performed by the loan broker server.

LENDER: A bank, finance company, mortgage bank, wholesale lender, or other entity in the business of providing loans.

LOAN ACCEPTANCE CRITERIA: Attributes the lender requires to be possessed by a potential consumer in order to make a loan available to that consumer.

MINIMUM COMPLIANCE LEVEL OF DATA: The baseline criteria required for determining loan eligibility and pricing that is uniformly collected from each individual lender and is then modified as necessary, organized, and stored in conjunction with like criteria from all other lending institutions. The aggregation of such criteria from each of the plurality of lending institution's underwriting and interest rate pricing guidelines forms the loan broker server's searchable and centralized lender database for use in matching and optimizing loan products and associated interest rate pricing for a consumer. This baseline criteria comprises: credit score, loan amount, cash-out amount, loan-to-value ratio (LTV), combined loan-to-value ratio (CLTV), front DTI, back DTI, PITI reserve requirements, tradelines, payment history, bankruptcy history, foreclosure history/information, notice of default history/information, interest only versus fully amortizing, product terms, use of proceeds, lien position, property type, occupancy type, property location, documentation type, and employment type.

PLURALITY OF LENDERS: A group of lenders that are not affiliated in any way other than in their participation in the loan market as competitors for loans.

QUALIFICATION ENGINE: The programming algorithms performed by the loan broker server that determines if a consumer profile qualifies for one or more of a plurality of lenders' loan products by comparison of the consumer profile to the guidelines of the minimum compliance level of data.

Those skilled in the art will appreciate that the present invention may be implemented with many different types of computer system configurations, including hand-held devices, multiprocessor systems, microprocessor based or programmable consumer electronics, network personal computers, minicomputers, mainframe computers, and the like. The present invention can also include multiple computer programs which embody the functions described herein and illustrated in the drawings, flow charts, and programming logic. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the drawings, flow charts, and programming logic and associated description in the application text, for example.

Therefore, disclosure of a particular set of program code instructions is not considered necessary for an adequate understanding how to make and use the invention. The inventive functionality of the claimed computer program will be explained in more detail in the following description in conjunction with the remaining Figures illustrating the functions and program flow. Certain steps in the program flow described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

FIG. 1 block diagram shows network system 40 having one or more loan broker servers 50 and one or more client processors or nodes 10, 20, 30, coupled thereto. Those of ordinary skill in the art will appreciate that the network interface 130, 230, 330, 530 includes the necessary circuitry for connecting the loan broker servers, client processors, or nodes to the network 40, and that the network interface 130, 230, 330, 530 is also preferably constructed for use according to the standard Transmission Control Protocol/Internet Protocol ("TCP/IP") protocol, the Internet Inter-ORB Protocol ("IIOP"), or other conventional digital networking and data communications scheme.

Preferably, client 10 represents one or more lender servers, client 20 represents one or more consumer devices, and client 30 represents one or more credit bureau or other alternative data servers and/or devices.

It is contemplated herein that network 40 may be embodied in conventional and/or proprietary, wired and/or wireless, hardware and/or software, integrated and/or modular means for sending and receiving digital data, light, and/or electronic signals between processors, nodes or other addressable network sites coupled thereto. Moreover, it is contemplated that server or client device functionality may be embodied in one or more processing machines, devices, or combined components and a single processing machine, device, or combination of components may perform functionality of multiple server and/or client processors.

In accordance with present invention, network 40 including loan broker server(s) 50 and client(s) 10, 20, 30 employs software and/or other functionally equivalent firmware, hardware, or electronics for read/write operations with one or more digital data or digital memory or functionally equivalent network-accessible electronic storage to access data or store data about one or more clients 10, 20, 30 associated with previously stored, currently measured, or preferred network or node configuration, on-line network traffic, schedule events, or subscribed or qualified affiliation. Preferably, such software functionality is implemented using embedded or real-time operating (RTOS) code convention, JAVA, C/C++, Windows/CE, or other equivalent digital signal processing instruction scheme, according to operational definition described herein.

Preferably, clients 10, 20, 30 are classified into or otherwise associated with sets, super-sets, sub-sets, groups, super-groups, sub-groups, or other hierarchical category according to pre-specified or dynamically defined criteria for qualification therein. Particular set or sets may be logically mapped, assigned contextually or otherwise related to one or more corresponding targeted on-line message or electronic/optical network signals, as described herein. Additionally, network 40, including loan broker server(s) 50 and client(s) 10, 20, 30 may employ software and/or other functionality for directing or targeting on-line messages or electronic/optical signals to selected or classified client set or group adaptively or dynamically according to monitored or specified set characteristics or attributes. For example, one or more consumer devices with similar characteristics and requesting or with potential interest in certain types of products, incentives, information, or transactions may be grouped with one or more lender servers that provide the requested products, incentives, information, or transactions.

Figure 2:
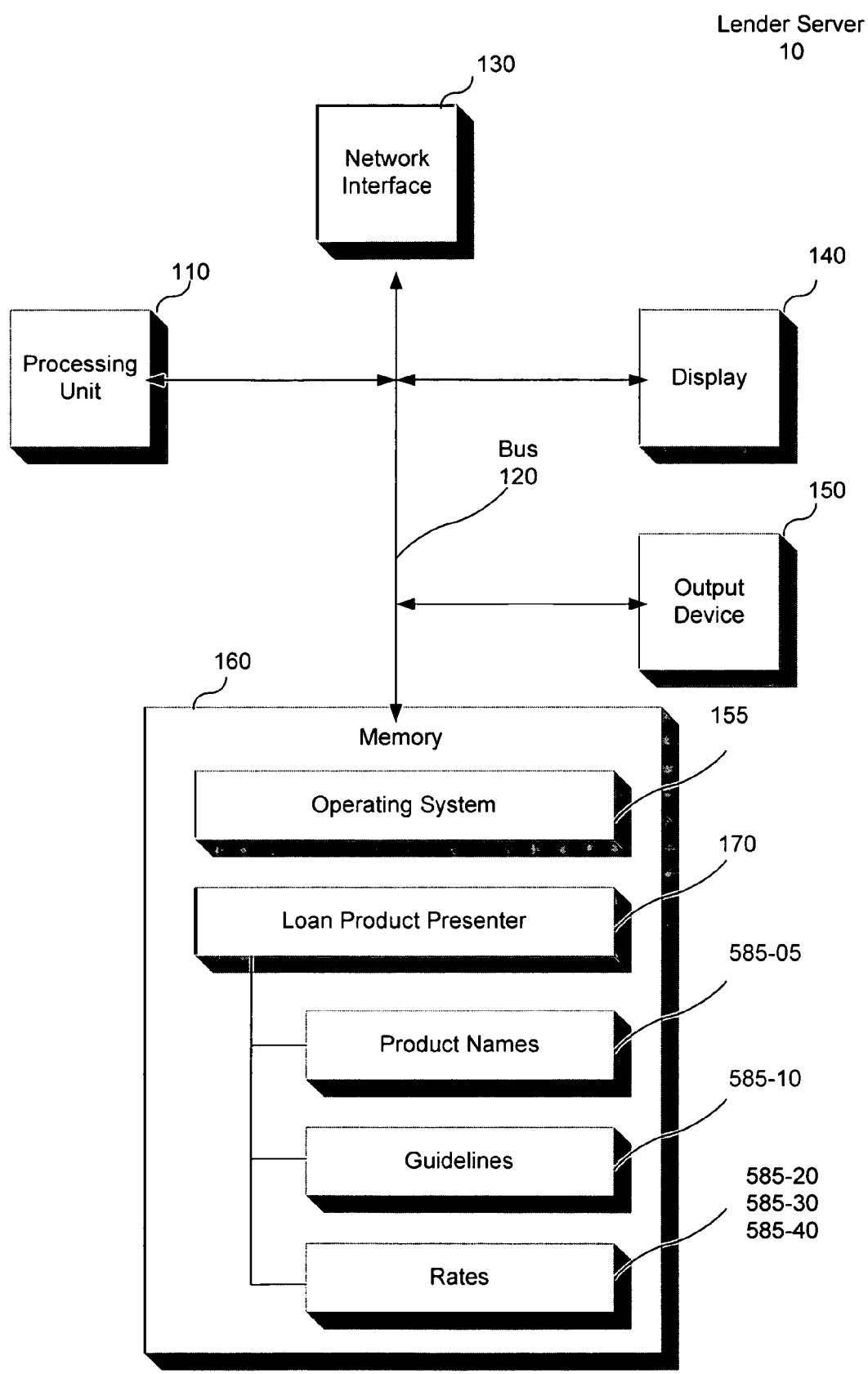
FIG. 2 shows a block diagram illustrating several components of the lender server of FIG. 1 used to obtain lender product data in accordance with an embodiment of the present invention.

FIG. 2 depicts several of the key components of the lender server 10. Those of ordinary skill in the art will appreciate that the lender server 10 includes many more components than those shown in FIG. 2. However, it is not necessary that all of these generally conventional components be shown in order to disclose an enabling embodiment for practicing the present invention. As shown in FIG. 1, the lender server 10 is connected to the network 40 via a network interface 130. Those of ordinary skill in the art will appreciate that the network interface 130 includes the necessary circuitry for connecting the lender server 10 to the network 40, and is also constructed for use with the TCP/IP protocol, other protocols such as IIOP, or other conventional digital networking and data communications scheme.

The lender server 10 also includes a processing unit 110, a display 140, an output device 150, an operating system 155, and a mass memory 160 all interconnected along with the network interface 130 via a bus 120. The output device 150 could be any type of device capable of receiving output from the lender server 10, for example a printer, a smart card reader, a plotter or a storage mechanism like a floppy, tape, DVD/CD-ROM drive, or portable hard drive. The mass memory 160 generally comprises a random access memory ("RAM"), a read-only memory ("ROM"), and one or more permanent mass storage devices, such as a hard disk drive, tape drive, optical drive, floppy disk drive, or combination thereof. The mass memory 160 stores the program code and data necessary for receiving, processing, formatting, requesting or sending one or more loan product names, related underwriting and pricing guidelines and characteristics, and related rates as well as supplying the results of that processing to other devices such as the loan broker server(s) via the network 40 as shown in FIG. 1 in accordance with an embodiment of the present invention. More specifically, the memory 160 stores a loan product presenter process 170 to generate one or more loan product names, related guidelines and characteristics, and related rates within a minimum level of compliance as shown and described in further detail with reference to FIG. 6, the loan broker lender database 585.

Although an exemplary lender server 10 has been described that generally conforms to a single conventional general purpose computing device, those of ordinary skill in the art will appreciate that a lender server 10 may be a combination of computing devices or components, coordinated to communicate with one or more loan broker servers 50 over a network 40.

Figure 3:
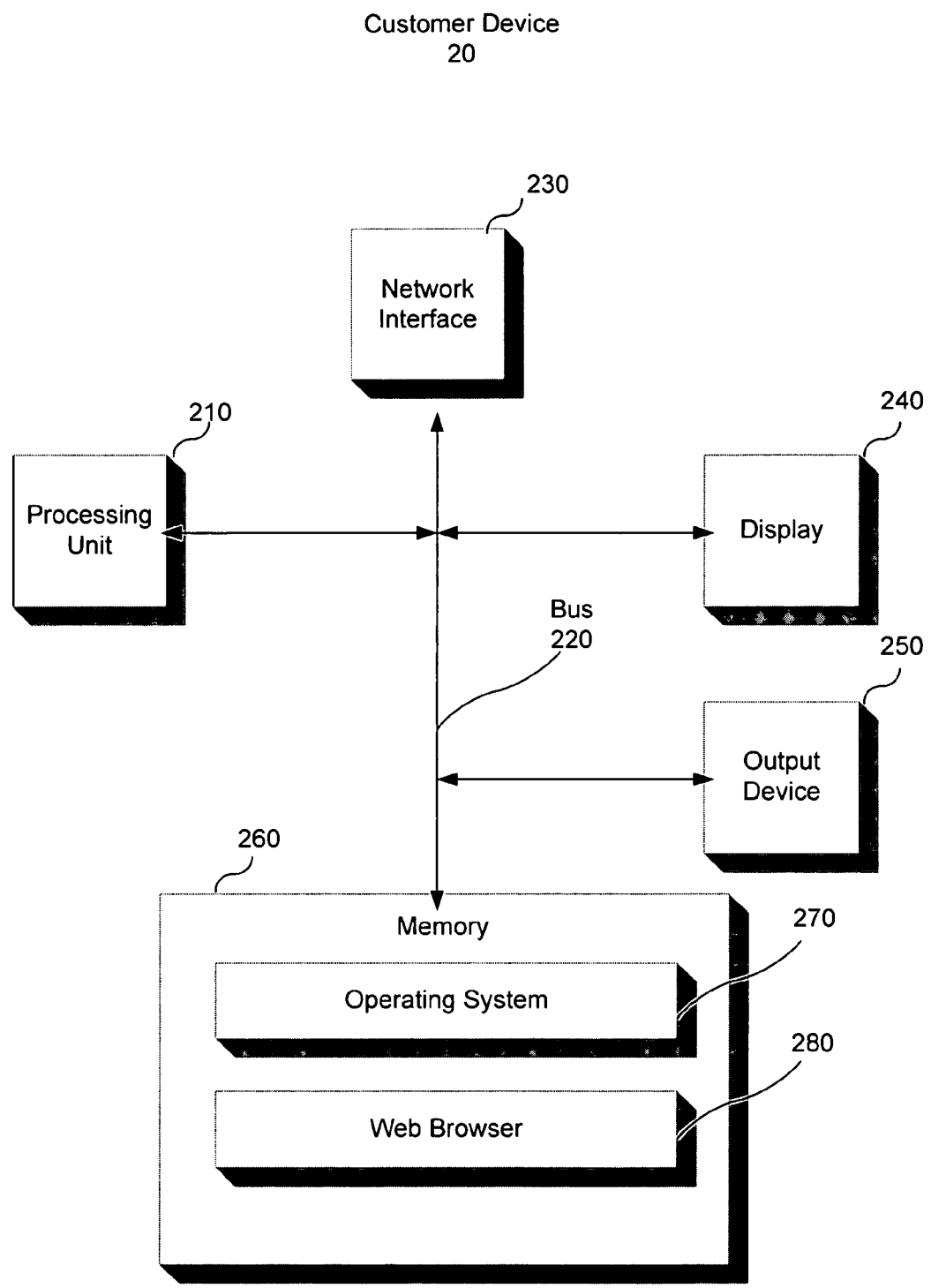
FIG. 3 shows a block diagram illustrating several components of the customer device of FIG. 1 used to obtain consumer data in accordance with an embodiment of the present invention.

FIG. 3 depicts several of the key components of the customer device 20. Those of ordinary skill in the art will appreciate that the customer device 20 includes many more components than those shown in FIG. 3. However, it is not necessary that all of these generally conventional components be shown in order to disclose an enabling embodiment for practicing the present invention. As shown in FIG. 1, the customer device 20 is connected to the network 40 via a network interface 230. Those of ordinary skill in the art will appreciate that the network interface 230 includes the necessary circuitry for connecting the customer device 20 to the network 40, and is also constructed for use with the TCP/IP protocol, other protocols such as IIOP, or other conventional digital networking and data communications scheme. Alternatively, a customer device 20 may be located with a customer service representative who would submit information required for creation of a consumer profile on the behalf of a potential customer who does not have direct access to the network 40 but is in direct contact with the customer service representative via the global telecommunications network.

The customer device 20 also includes a processing unit 210, a display 240, an output device 250, and a mass memory 260 all interconnected along with the network interface 230 via a bus 220. The output device 250 could be any type of device capable of receiving output from the customer device 20, such as, but not limited to, a printer, a smart card reader, a plotter or a storage mechanism like a floppy, tape or DVD/CD-ROM drive. The memory 260 generally comprises a RAM, a ROM, and a permanent storage device, such as a hard disk drive, tape drive, optical drive, floppy disk drive, or combination thereof. The memory 260 stores an operating system 270 and a Web browser 280. It will be appreciated that these software components may be loaded from a computer-readable medium into memory 260 of the customer device 20 using a drive mechanism (not shown) associated with the computer-readable medium, such as a floppy, tape or DVD/CD-ROM drive or via the network interface 230.

Although an exemplary customer device 20 has been described that generally conforms to a conventional general purpose computing device, those of ordinary skill in the art will appreciate that a customer device 20 may be any of a great number of devices capable of communicating with the network 40, e.g., a cell phone, a wired or wireless personal digital assistant, workstation, laptop, etc.

Figure 4:
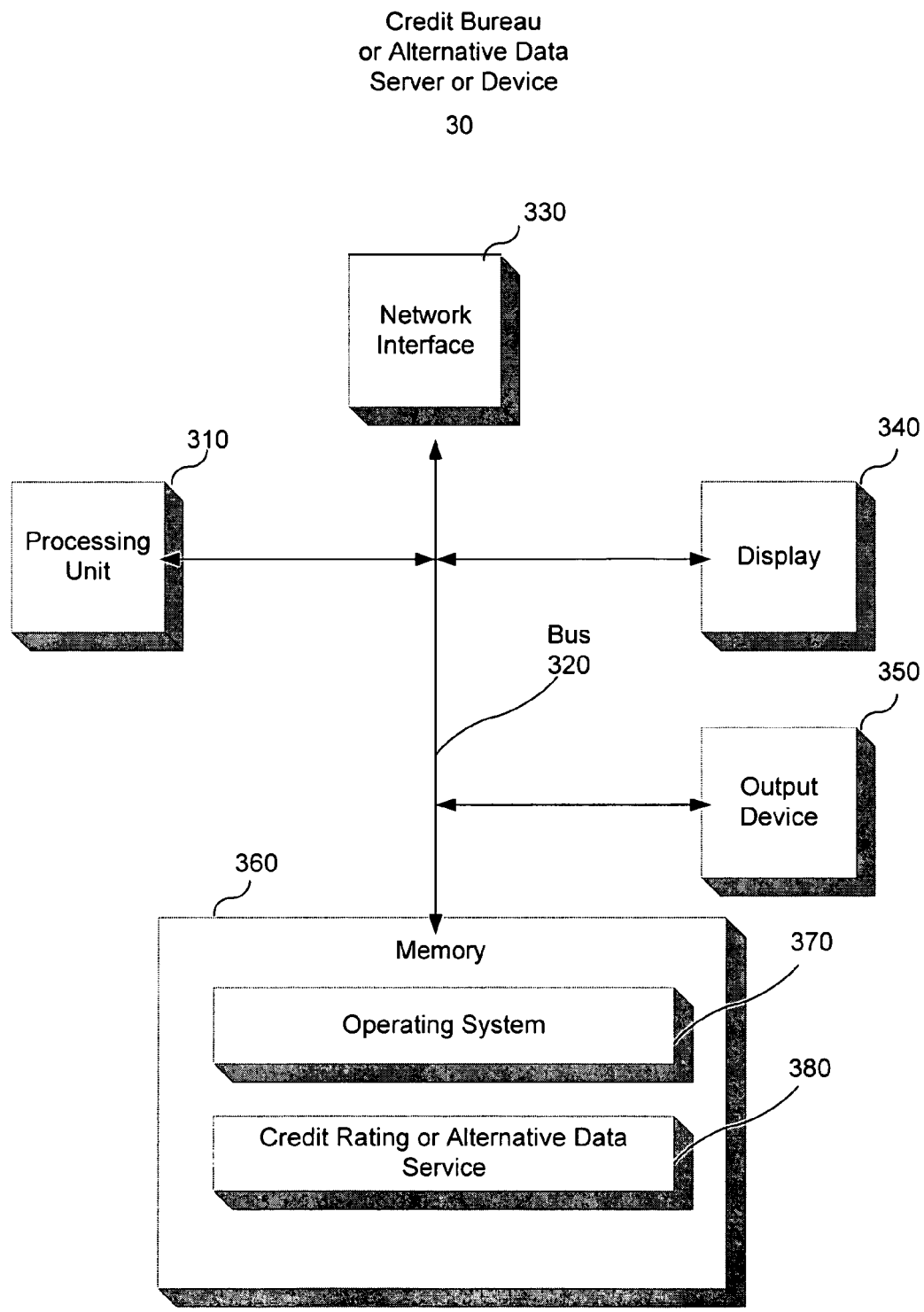
FIG. 4 shows a block diagram illustrating several components of the credit bureau or alternative data server or device of FIG. 1 used to obtain credit rating or alternative data in accordance with an embodiment of the present invention.

FIG. 4 depicts several of the key components of the credit bureau or alternative data server or device 30. Those of ordinary skill in the art will appreciate that the credit bureau or alternative data server or device 30 includes many more components than those shown in FIG. 4. However, it is not necessary that all of these generally conventional components be shown in order to disclose an enabling embodiment for practicing the present invention. As shown in FIG. 1, the credit bureau or alternative data server or device 30 is connected to the network 40 via a network interface 330. Those of ordinary skill in the art will appreciate that the network interface 330 includes the necessary circuitry for connecting the credit bureau or alternative data server or device 30 to the network 40, and is also constructed for use with the TCP/IP protocol, other protocols such as IIOP, or other conventional digital networking and data communications scheme.

The credit bureau or alternative data server or device 30 may also include a processing unit 310, a display 340, an output device 350, and a mass memory 360 all interconnected along with the network interface 330 via a bus 320. The output device 350 could be any type of device capable of receiving output from the credit bureau or alternative data server or device 30, such as, but not limited to, a printer, a smart card reader, a plotter or a storage mechanism like a floppy, tape or DVD/CD-ROM drive. The mass memory 360 generally comprises a RAM, a ROM, and one or more permanent mass storage devices, such as a hard disk drive, tape drive, optical drive, floppy disk drive, or combination thereof. The mass memory 360 stores an operating system 370 and the program code and data necessary for receiving, processing, formatting, requesting and sending one or more credit bureau reports or alternative information used to obtain credit rating or alternative data as well as supplying the results of that processing to other devices such as the lender servers 10, the customer devices 20, or the loan broker servers 50 via the network 40 as shown in FIG. 1 in accordance with an embodiment of the present invention. More specifically, the mass memory 360 stores a credit rating or alternative data service 380 to render and serve credit bureau reports or alternative data, for example income verification or employment verification or property title information or electronic disclosures or electronic signatures, used to obtain credit rating or alternative information in response to a request from devices such as the loan broker server 50, as well as supplying the results of that processing to other devices such as the lender servers 10 and/or the customer devices 20 via the network 40 in accordance with an embodiment of the present invention. Alternatively, the loan broker server 50 may communicate with alternative data server(s) or device(s) 30 belonging to other institutions that deal with conforming loans, meaning the loans meet the criteria for maximum loan amounts and other standards set forth by Fannie Mae or Freddie Mac for example.

Although an exemplary credit bureau or alternative data server or device 30 has been described that generally conforms to a single conventional general purpose computing device, those of ordinary skill in the art will appreciate that a credit bureau or alternative data server or device 30 may be a combination of computing devices or components, coordinated to communicate with the loan broker server 50 or other devices over a network 40.

Figure 5:
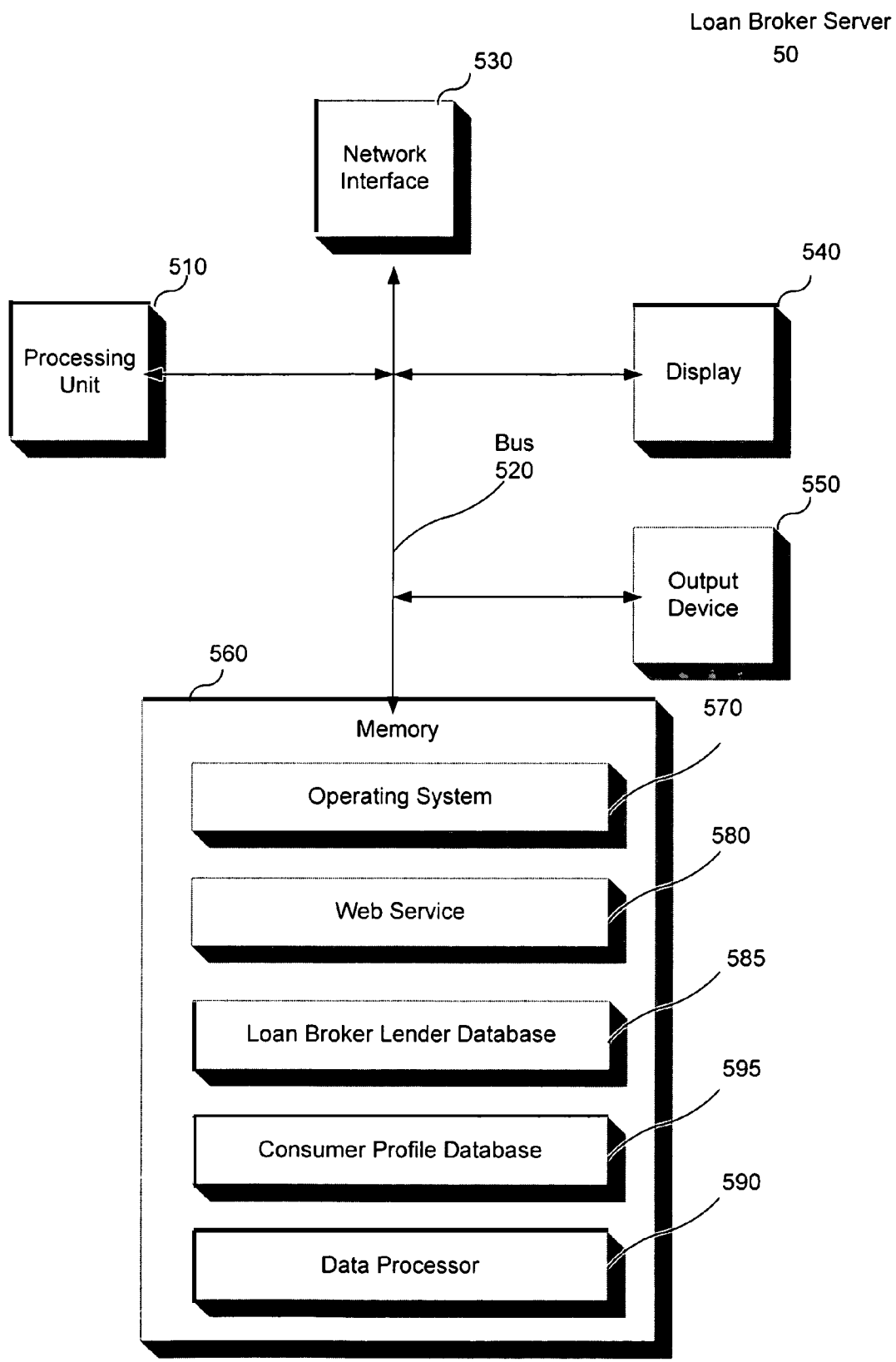
FIG. 5 shows a block diagram illustrating several components of the loan broker server of FIG. 1 used to obtain obtain/receive and store data, perform operations, and process and export data in accordance with an embodiment of the present invention.

FIG. 5 depicts several of the key components of the loan broker server 50. Those of ordinary skill in the art will appreciate that the loan broker server 50 includes many more components than those shown in FIG. 5. However, it is not necessary that all of these generally conventional components be shown in order to disclose an enabling embodiment for practicing the present invention. As shown in FIG. 1, the loan broker server 50 is connected to the network 40 via a network interface 530. Those of ordinary skill in the art will appreciate that the network interface 530 includes the necessary circuitry for connecting the loan broker server 50 to the network 40, and is also constructed for use with the TCP/IP protocol or other protocols, such as the IIOP, or other conventional digital networking and data communications scheme.

The loan broker server 50 also includes a processing unit 510, a display 540, an output device 550, and a mass memory 560 all interconnected along with the network interface 530 via a bus 520. The output device 550 could be any type of device capable of receiving output from the loan broker server 50, such as, but not limited to, a printer, a smart card reader, a plotter or a storage mechanism like a floppy, tape or DVD/CD-ROM drive. The mass memory 560 generally comprises a RAM, a ROM, and one or more permanent mass storage devices, such as a hard disk drive, tape drive, optical drive, floppy disk drive, or combination thereof. The mass memory 560 stores an operating system 570 and the program code and data necessary for receiving, processing, formatting, requesting and sending one or more loan product names, related underwriting and pricing guidelines and characteristics, and related rates, as well as, supplying the results of that processing to other devices such as the customer device 20 in accordance with an embodiment of the present invention. The mass memory 560 includes a searchable loan broker lender database 585 of the lender product names, underwriting and pricing guidelines and rates received, processed, and formatted from a plurality of lender servers 10. Additionally, the memory 560 stores a web service 580 for providing web connectivity to the network 40 for devices and servers with web browsers, such as the customer device(s) 20 having web browser 280. The mass memory 560 also stores a data processor 590 for creation and storage of one or more of a consumer profile 502 or additional information required to initiate a transaction for one or more of the loan products. The data processor 590 also contains the matching and optimization program logic which is utilized for the matching of a consumer's qualifications and needs as defined by the consumer profile 502 to the best available loan products, and ranking of the available loan products and associated rate pricing as described with the flow chart of FIG. 9.

It will be appreciated that the aforementioned software components may be loaded from a computer-readable medium into mass memory 560 of the loan broker server 50 using a drive mechanism (not shown) associated with the computer-readable medium, such as floppy, tape or DVD/CD-ROM drive or via the network interface 530.

Although an exemplary loan broker server 50 has been described that generally conforms to a conventional general purpose computing device, those of ordinary skill in the art will appreciate that a loan broker server 50 may be any of a great number of devices capable of communicating via the network 40.

FIG. 6 shows a representation of fields within the loan broker lender database including the minimum compliance level of data in accordance with an embodiment of the present invention. The actual database is a numerical matrix generated by receiving and storing data from a plurality of lending institutions. Each institution has specific underwriting and pricing guidelines for the loan products that they offer comprising loan characteristics, qualifying ratios and limits, base rate pricing, yield spread rate pricing, and rate add-ons. Different lenders may require different information than one another and base their individual loan qualification and pricing decisions on different criteria. This invention may receive, modify, and store a minimum amount of information from each lending institution, the "minimum compliance level of data", for use as described further in FIG. 8 and FIG. 9. The fields included in the minimum compliance level of data are highlighted in bold in FIG. 6 and comprise credit score, loan amount, cash-out amount, loan-to-value ratio (LTV), combined loan-to-value ratio (CLTV), front DTI, back DTI, PITI reserve requirements, tradeline requirements, payment history, bankruptcy history, foreclosure history/information, notice of default history/information, interest only versus fully amortizing, product terms, use of proceeds, lien position, property type, occupancy type, property location, documentation type, and employment type. This baseline criteria is uniformly collected from each individual lender and is then modified as necessary, organized, and stored in conjunction with like criteria from all other lending institutions.

Additional data may be received, modified, and stored in the loan broker lender database for use in alternative embodiments of the present invention, for example disposable income requirements, reserve requirements, seasoning, acreage, square footage, properties owned, rate buy-down "points", yield spread (also known as service release premium or gain on sale), prepayment penalty requirements, currently own or rent, number of years in current job, number of years in current industry, number of years in current career, highest credit limit, number of years of credit on file, first time homebuyer requirements, escrowing taxes and insurance, prepayment penalties, lock terms, employment status (student, part time, etc), number of mortgages currently on property, source of down payment, has property been on the market in last twelve months, other sources of income, party to a lawsuit or not, is any of the down payment borrowed, current mortgage or loan insurance, citizenship status, residency status, co-borrower requirements, trailing spouse income, number of units owned, number of loans to same bank, properties held in trust requirements, consumer credit history, judgments, liens, chargeoffs, second job, gift of equity, gift funds, seller concessions, seller carryback, construction loan, owner/builder loan, 1031 exchange, non traditional credit/tradelines (utility bills, phone bill, etc.), payment shock, (percent increase of current housing expense to proposed housing expense), rental history, entity of borrower, age of borrower, immigration status, conservator and guardian involvement, non-borrowing spouse requirements, cash-out requirements, seller's length of ownership, multiple loans to same borrower, non-arm's length transaction requirements, arm's length transactions, buy-down plans and terms, financing concessions, interested parties, escrow requirements, affordable seconds/subsidized financing requirements, trailing secondary earner's income, income requirements, expense requirements, asset requirements, documentation requirements, employment requirements, age of credit report, delinquent accounts, collection accounts, credit report requirements, or contingent liabilities.

The aggregation of such criteria from each of the plurality of lending institution's underwriting and pricing guidelines forms the loan broker server's searchable and centralized lender database for use in matching and optimizing loan products and associated rate pricing for a consumer.

Figure 7:
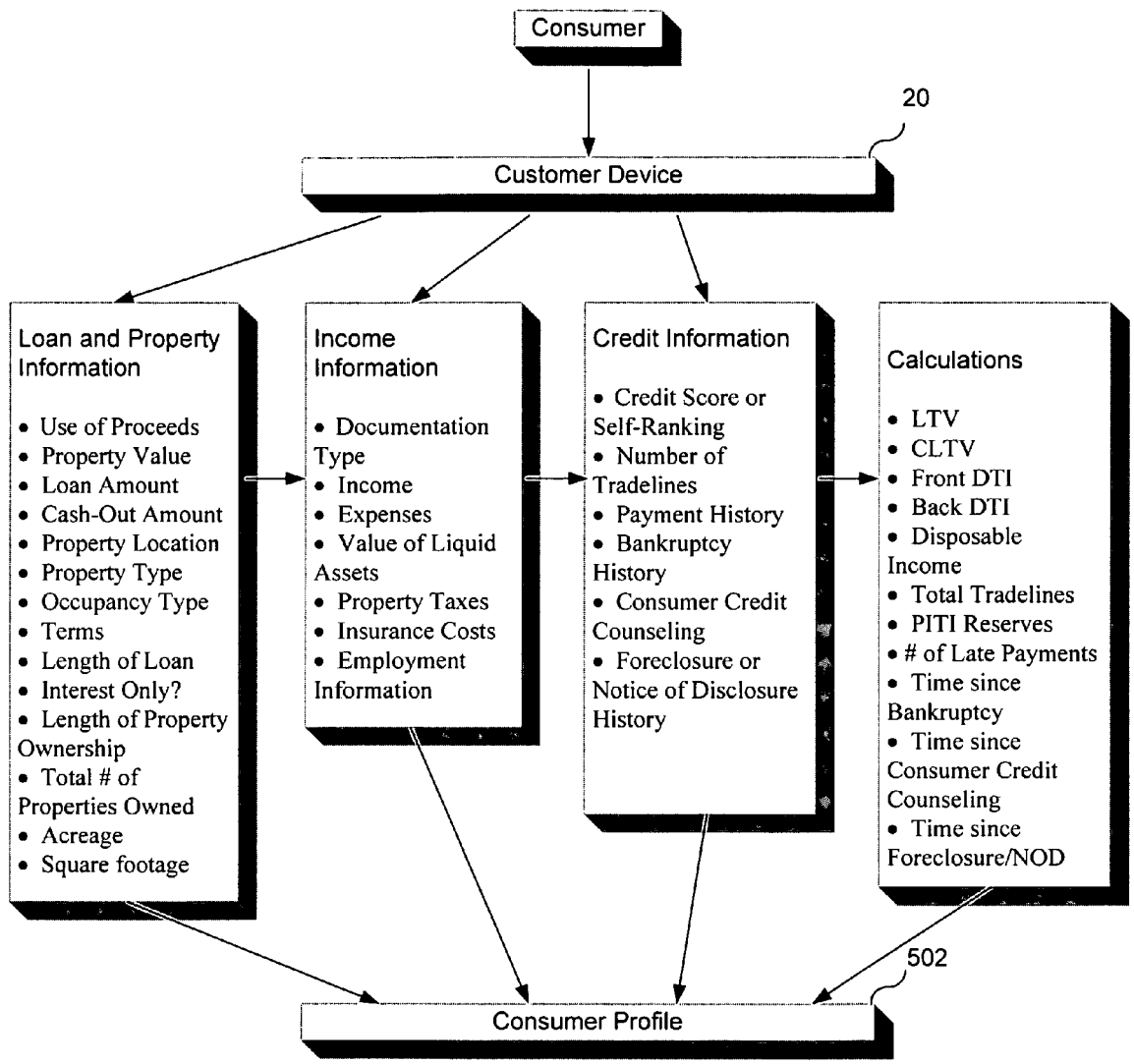
FIG. 7 shows an overview flow diagram illustrating information obtained and logic implemented using the devices of FIG. 1 to create a custom consumer profile in accordance with an embodiment of the present invention.

FIG. 7 shows an overview flow diagram illustrating information obtained and logic implemented using the devices of FIG. 1 to create a custom consumer profile in accordance with an embodiment of the present invention.

Utilizing some components of the loan broker computing apparatus of FIG. 1, a consumer is able to use a customer device 20 to interact with the loan broker server 50 for the purpose of providing loan and property information, income information, and/or credit information used in the creation of a consumer profile to be further used for searching a centralized database of a plurality of lending institutions' underwriting and pricing guidelines on behalf of that consumer. Credit information or alternative data may also be obtained automatically via credit bureau or alternative data server(s) or device(s) 30 in alternative embodiments of the current invention.

Loan and property information comprises use of proceeds, property value, loan amount, cash-out amount, property location, property type, occupancy type, loan terms (for example fixed versus adjustable), length of loan, interest only loan or otherwise, seasoning on property (length of property ownership for refinancing), total number of properties owned, acreage, or square footage. Income information comprises type of income documentation, income, expenses, and value of liquid assets, property taxes, insurance cost, or employment information. Credit information comprises credit score(s) (FICO or otherwise), credit self-ranking, tradelines, payment history, bankruptcy history, consumer credit counseling history, or foreclosure or notice of default history. Additional information which may be obtained either directly from the consumer or through communication between a loan broker server 50 and credit bureau or alternative data server(s) or device(s) 30, for example lien position, prepayment penalties, rate buy-down "points", yield spread, number of units owned, type of employment (self versus salaried), or notice of default may be used amongst others in alternative embodiments of the current invention.

This information is communicated to the loan broker server over the network 40 using the network interface 230 and/or 330. Calculations which may then be performed by the loan broker server data processor 590 comprise loan-to-value ratio (LTV), combined loan-to-value ratio (CLTV), front debt-to-income ratio (DTI), back DTI, disposable income, total tradelines, principal, interest, property taxes, and insurance (PITI) reserves, number of late payments, time since bankruptcy, time since consumer credit counseling, or time since foreclosure or notice of default (NOD). Additional calculations necessary for matching the consumer's qualifications and needs to the best available loan products with associated rate pricing or to initiate or complete a transaction may also be included in alternative embodiments. FIG. 10 shows a representative example of a consumer output that includes components of the custom consumer profile in accordance with an embodiment of the present invention.

The custom consumer profile may be stored in the loan broker server's memory 560 for use further described below with reference to FIG. 9. The custom consumer profile may also be viewed by an output device 250 and confirmed as correct or modified by the consumer.

Figure 8:
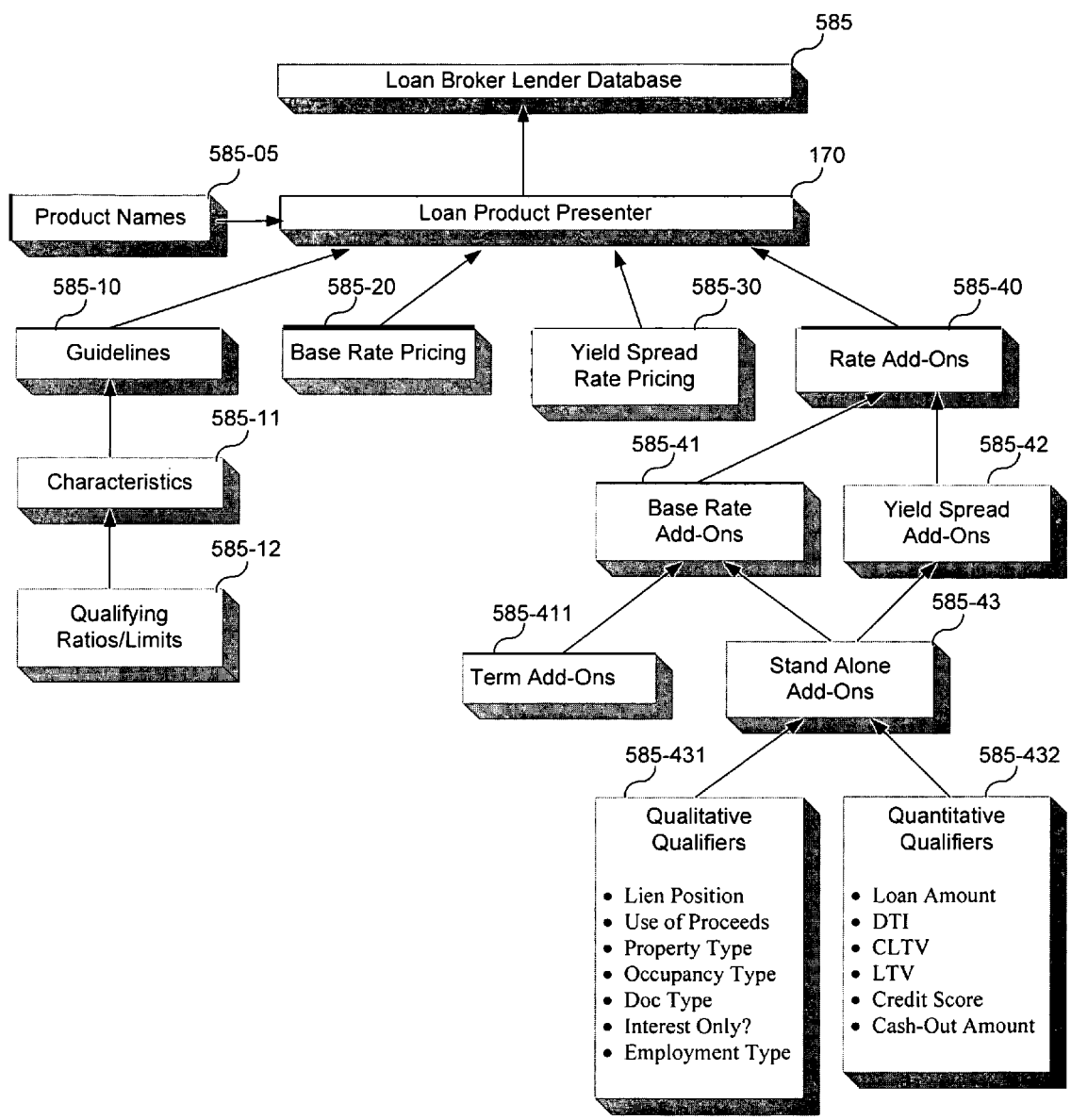
FIG. 8 shows an overview flow diagram illustrating information obtained and logic implemented using the devices of FIG. 1 to create a custom loan broker lender database in accordance with an embodiment of the present invention.

FIG. 8 shows an overview flow diagram illustrating information obtained and logic implemented using the devices of FIG. 1 to create a custom loan broker lender database in accordance with an embodiment of the present invention.

Utilizing some components of the loan broker computing apparatus of FIG. 1, a loan broker server 50 is able to interact with the lender server(s) 10 over the network 40 for the purpose of creating, organizing, and updating a centralized and searchable loan broker lender database 585 of a plurality of lending institutions' underwriting and pricing guidelines for loan products. The loan broker lender database includes guidelines 585-10 comprising qualifying limits 585-12 and characteristics 585-11, base rate pricing 585-20, yield spread pricing 585-30, and rate add-ons 585-40 comprising base rate add-ons 585-41 and yield spread add-ons 585-42 further comprising term add-ons 585-411 and stand alone add-ons 585-43. The loan broker lender database 585 is comprised partly of a minimum compliance level of data obtained by the loan broker server(s) 50 from each lender regarding that lender's loan products.

Every loan product has qualifying limits 585-12 that determine if a consumer profile 502 stored in loan broker memory 560 qualifies for a particular loan product. The qualifying limits and/or ratios comprise data contained within the minimum compliance level of data except for employment type. This includes but by definition is not limited to credit score (FICO or other alternative scoring), loan amount, cash out amount, LTV (loan-to-value), max CLTV (combined loan-to-value), "front" DTI (debt-to-income), and "back" DTI. Qualifying limits may also include other data, for example employment type, seasoning, square footage, acreage, number of properties owned, time of credit on file, chargeoffs, delinquent accounts, judgments, collections, or highest credit limit, as well as others in accordance with alternative embodiments of the present invention and represented by numerical values. These qualifying limits 585-12 are stored as a numerical matrix of qualifying factors and determine if a consumer and corresponding consumer profile qualifies for any of all existing loan products in the loan broker lender database. For example, a person may need a minimum FICO credit score of 500 to qualify for any of a particular lending institution's loan products. However, that same consumer may need a minimum FICO credit score of 620 to qualify for a loan greater than $500,000 with that same lender. These limits act as "min" and "max" functions, and a consumer profile will not qualify for a particular product if it falls above or below those limits in any category. The qualification process is a binary ("yes" or "no") outcome.

The characteristics 585-11 are descriptors for a lending institution's loan products and define the loan products that a lender offers in accordance with an embodiment of the present invention. These characteristics comprise data contained within the minimum compliance level of data except for employment type. This includes but by definition is not limited to lien position, use of proceeds, property type, occupancy type, property location, terms, or documentation type. Characteristics may also include other data, for example lender name, product line name, first time homebuyer requirements, escrow requirements, employment type, residency status, citizenship status, other cash out requirements, 1031 exchange requirements, down payment requirements and parameters, construction loan requirements, subsidized financing requirements, or requirements for "arm's length" and "non-arm's length" transactions as well as others in accordance with alternative embodiments of the present invention. Each characteristic may have options within it. For example, under "use of proceeds," the option may exist to use the loan for purchasing a home, refinancing a home, or refinancing a home and taking cash out. Similarly under "terms," there may be options for a 30 year fully amortizing fixed mortgage, a 3 year interest only adjustable rate mortgage (ARM), etc. A loan product type is defined by the aggregate options within each characteristic. The numerical matrix of the limits corresponds to these characteristics and sub-categories, and the numerical matrix can be additionally assigned to multiple sub-categories under each characteristic.

In the present invention, these qualifying limits 585-12 and characteristics 585-11 are entered into a standard format into the loan broker lender database 585 such that a plurality of numerical matrices may be created within a lending institution's specific product line(s). A consumer profile 502 would be run against the sub-categories under each characteristic to match the profile with the lenders' products to see which lending institution(s) offer the product sought by the consumer. The programming logic matches the appropriate numerical matrix in the loan broker lender database 585 to the loan product requested by the consumer to see if the consumer's profile qualifies ("yes" or "no") for that particular product.

In addition to qualifying limits and characteristics, every loan product also has associated interest rate pricing, and the minimum compliance level of data includes two methods utilized for determining loan product pricing: base rate pricing 585-20 and yield spread rate pricing 585-30 each coupled with the applicable rate add-ons 585-40.

Base rate pricing 585-20 is accomplished by creating within the lender database 585 a pricing matrix with rates determined by all factors that comprise the minimum compliance level of data except for tradelines, property type, occupancy type, front DTI, back DTI, PITI reserves, and employment type. Determining factors of base rate pricing may also include, for example, tradelines, property type, occupancy type, front DTI, back DTI, PITI reserves, and employment type, yield spread, rate buy-down ("points"), rate lock terms, pre-payment penalty requirements and terms, escrow requirements, seller concessions, seller carry-backs, as well as others in accordance with alternative embodiments of the present invention. Each individual lending institution may utilize and present this specific loan product information differently, and an embodiment of the present invention creates and updates a standardized, centralized and searchable loan broker lender database 585 containing in part this information.

Yield spread rate pricing 585-30 determines pricing adjustments corresponding to the particular products in the pricing matrix and is accomplished by creating within the loan broker lender database 585 a matrix of starting rates that correspond to a set of yield spreads (also known as service release premiums or gain on sale) and rate buy-downs that are assigned to a particular loan type (for example a 30 year fixed mortgage, a 3 year adjustable rate mortgage ARM, etc.) under a lender's product line as determined by a lending institution. A higher yield spread corresponds to a higher loan product interest rate, and a higher rate buy-down corresponds to a lower loan product interest rate. A yield spread is a percentage paid to a lender as incentive for providing a consumer a higher rate loan. For example, a lender may be able to provide a consumer with a 6.0% loan and earn a 0.5% yield spread or service release premium wherein the lender would be paid 0.5% of the loan. If the lender/officer instead provided a consumer loan with a 5.75% interest rate, the lender might earn zero yield spread ir service release premium. A rate buy-down works the opposite way. A consumer may be able to obtain a loan product with a rate of say 5.0% if 1% of the loan (a "point") is paid in advance. Conversely, if no points are paid, the loan product interest rate may be higher, say 5.5%.

Yield spread rate pricing 585-30 is accomplished by creating within the lender database 585 a pricing matrix with rates determined by all factors that comprise the minimum compliance level of data except for tradelines and PITI reserves. Determining factors of yield spread rate pricing may also include, for example, tradelines, PITI reserves, yield spread, rate buy-down ("points"), number of properties owned, number of units owned, escrow requirements, as well as others in accordance with alternative embodiments of the present invention. These characteristics create pricing adjustments that impact the Yield Spread and Rate Buy-Down assigned to a particular rate, and consequently impact the interest rate presented to the consumer. Each lender's product line is assigned a particular type of pricing, base rate or yield spread rate, and the information and rates are entered for each respective lender. Each individual lending institution may utilize and present this specific loan product information differently, and an embodiment of the present invention creates and updates a standardized, centralized and searchable loan broker lender database 585 containing in part this information.

Once a consumer profile 502 is given a "yes" or "no" for qualification of one or more of a lending institution's loan products, the profile is matched against the rate pricing for a particular lender. The programming logic matches the appropriate numerical matrix in the loan broker lender database 585 to determine which rate is applied in both the base rate and yield spread rate pricing scenarios for each particular loan product.

Rate add-ons 585-40 increase or decrease the rate pricing of a loan product based on the minimum compliance level of data except for tradelines and PITI reserves. Rate add-ons may also be determined by additional criteria, including but not limited to tradelines, PITI reserves, yield spread, rate buy-down, seasoning (length of property ownership), or escrow requirements for example among others as detailed in the consumer profile 502. For example, a consumer's profile may qualify for a loan product with a base rate interest rate of 5%, but the fact that the consumer profile is using a property as a second home rather than the primary residence may result in a base rate add-on 585-41 increase of 0.25%, for a total and final loan product par interest rate of 5.25%.

Rate add-ons also comprise term add-ons 585-411. Term add-ons only apply to loan products that have base rate pricing 585-20 wherein a loan product rate will be determined or calculated based on the attributes and characteristics of another loan product, but with a specified increase in rate. For example in accordance with an embodiment of the present invention, if a consumer profile requests a 3 year ARM, then the programming logic may determine or calculate a loan product interest rate for a specific 3 year ARM based off the rate matrix of a 2 year ARM, but with a term add-on 585-411 rate increase of 0.15%.

Rate add-ons also comprise stand alone add-ons 585-43. Stand-alone add-ons represent an increase or a decrease in the interest rate of a loan product or products within a lending institution's product line. Qualitative or quantitative qualifiers can trigger a stand-alone add-on either in isolation or as a combination of both quantitative and qualitative qualifiers. Qualitative qualifiers 585-431 may include certain components or combinations of components of the consumer profile 502 including but not limited to lien position, use of proceeds, property type, or employment type. In the present invention, a qualitative qualifier works as a binary trigger. For example, if a property type equals a low rise condo, then there is a stand-alone add-on 585-43 rate increase of 0.25%. Quantitative qualifiers 585-432 may include certain components of the consumer profile 502 including but not limited to loan amount, front DTI, back DTI, or credit score (FICO or otherwise). A quantitative qualifier can work as a binary trigger or a less than/greater than trigger. For example, if the loan to value (LTV) is greater than or equal to 95%, then there is a stand-alone add-on 585-43 rate increase of 0.10%. In an alternative embodiment, programming logic may enable consumers to pay "points" (finance charges paid by the consumer at the beginning of a loan whereas one point is 1% of the loan amount) either via a lump sum payment or as a percentage of the loan to secure a lower determined or calculated rate. This consumer option and method of payment may then become an additional element of the consumer profile previously described.

In accordance with an embodiment of the present invention if a consumer profile 502 qualifies for a lending institution's loan product(s), an initial interest rate is determined for that loan product. Programming logic as further described below and in accordance with FIG. 9 then matches the consumer profile with the appropriate rate add-ons 585-20, 585-30, 585-40. The available loan products may then be matched and presented with associated rate pricing to the consumer.

Figure 9:
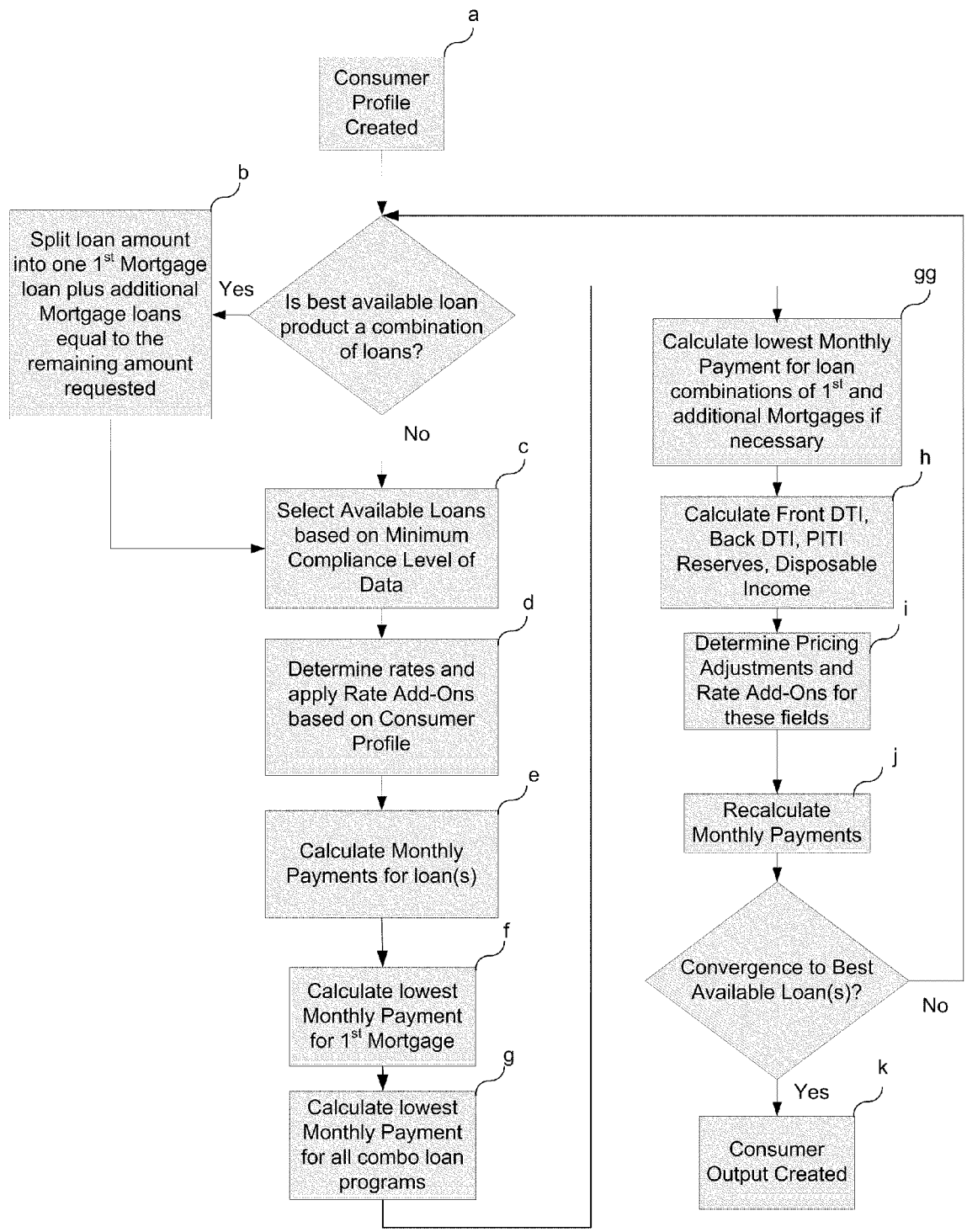
FIG. 9 shows a programming logic flow diagram which illustrates the actions taken by the devices illustrated in FIG. 1 to match needs and qualifications of a consumer to the best available loan products and rates in accordance with an embodiment of the present invention.
Figure 9:
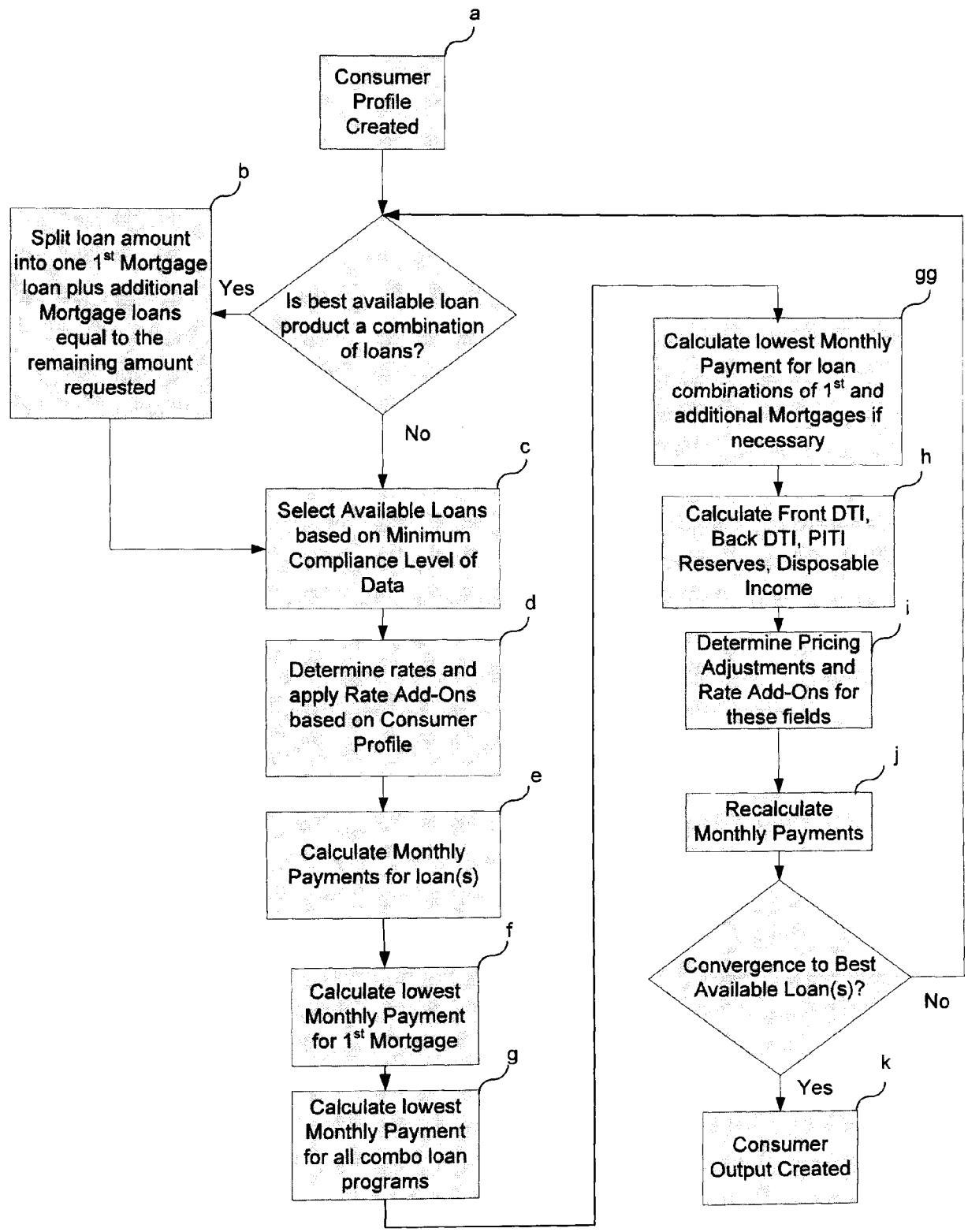

To better illustrate the matching of the consumer's qualifications and needs to the best available loan products with associated rate pricing, FIG. 9 is a diagram illustrating one embodiment of actions taken by the loan broker server shown in FIG. 5 to present the consumer output comprising the ranking of loan products, rates, Annual Percentage Rate (APR), and monthly payments in response to a loan query in accordance with an embodiment of the present invention. While home mortgages are used below to describe an illustrative loan product for which rates are presented using guidelines and rate matching according to an embodiment of the present invention, those of ordinary skill in the art will appreciate that the present invention applies equally well to other types of loan products such as, but not limited to, auto, boat, second mortgage, home equity loan, small business loan, commercial mortgage, student loan, personal loan, credit card, or other instances where qualifications and rates are matched such as for insurance, a bank account, stock brokerage account, or retirement account. Other types of loan products may exist without departing from the spirit of the invention. Furthermore, certain steps in the program flow described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

The data processor 590 examines the consumer profile 502 and proceeds to select all available loans based on the comparison of the consumer profile to at least a portion of the minimum compliance level of data but often to the other qualification components of the loan broker lender database 585. While the programming logic may determine that a singular loan product best meets the consumer's needs as detailed in the consumer profile, a useful and innovative component of the present invention allows the data processor to combine a plurality of available loan products to create and offer a combination of loans that may best meet the consumer's needs by providing a combined loan with the overall lowest monthly payments or lowest blended par rate. This best available loan product may be a combination of loan products that are offered by the same or a plurality of lending institutions. A "combo-loan" product with an 80/20% ratio of two loans is described below; however, examples exist because of this invention wherein the consumer may otherwise obtain optimal loan product pricing with combinations of loans combined in for example a 75/25% ratio, 90/10% ratio, or even for example a 40/15/5% ratio of three individual loan products combined to satisfy a consumer's need for a 60% LTV loan.

In the present example with an assumed LTV greater than 80%, the data processor creates one or more additional temporary "dummy" consumer profiles that allow for qualification of multiple loan products for the creation of a combined best available loan product solution. For example, the desired loan amount could be divided into a first mortgage equal to exactly 80% of LTV and a second mortgage with the remaining LTV. If the desired LTV is 80% or less, the program logic could proceed with only the first mortgage equal to that LTV as originally entered, or it could determine that a combination of mortgages could still provide the best solution for matching the consumer's qualifications and needs to the best available loan products with associated rate pricing.

The data processor 590 accomplishes this by next searching the loan broker lender database 585 to obtain and match all rates 585-20, 585-30 and rate add-ons 585-40 for the consumer profile 502 and calculating monthly payments based on the requested loan amount for each applicable loan product. The program logic does not calculate monthly payments for loan products that do not match the consumer profile regarding the following fields: use of proceeds, property type, occupancy type, property location, and loan terms. The calculation of monthly payments does not include yield spread pricing adjustments or rate add-ons based on the fields that are dependent on monthly payment amounts, for example front DTI, back DTI, PITI reserves, and disposable income.

Alternative embodiments exist for which the programming logic executes alternative steps in differing order; however, in the present example the data processor 590 next optimizes loan product pricing by calculating monthly payments for all loan products that satisfy the requirements of the consumer profile (step f). If "combo" loans are a subset of all loan products available, then monthly payments are calculated for traditional loan products followed by calculations for the available combo loans (step g and gg).

For each available loan product, the data processor 590 now (step h) calculates the criteria in the consumer profile 502 that are dependent on the value of the monthly payment, namely: front DTI, back DTI, PITI reserves, and disposable income. Based on these calculations, rate add-ons 585-40 are determined accordingly (step i). Monthly payments are recalculated (step j) and steps b or step c through step j are repeated by the data processor 590 in iterative fashion to conclusion of loan product pricing optimization.

The loan broker server(s) also have the ability to communicate with credit bureau or alternative data servers or devices, for example, other institutions that deal with conforming loans—that is, loans that meet the criteria for maximum loan amounts and other standards set forth by Fannie Mae and Freddie Mac. In alternative embodiments, consumers may access the automated underwriting systems of such institutions (after step b of FIG. 9) or obtain access to the updated and stored information via the loan broker lender database. For example, the data processor 590 may compare a consumer profile to the qualification standards of Desktop Underwriter or Loan Prospector, the automated underwriting systems of Fannie Mae and Freddie Mac, respectively, to determine if the consumer qualifies for a conforming loan product. If so, the data processor may also obtain typically lower associated conforming loan rate pricing.

The consumer profile 502 is processed through the qualification engine for comparison against the guidelines 585-05 of the loan broker lender database 585 by the data processor 590. All fields are compared including front DTI, back DTI, PITI reserves, and disposable income calculated based on optimized pricing and accounting for all rate add-ons as discussed above.

The data processor 590 now has the data to rank all available loan products according to interest rate, monthly payment, and Annual Percentage Rate (APR). The consumer output will rank both single mortgage options and/or combination options to illustrate the best available loan products with associated rate pricing (step k).

A representative example of this final consumer output is shown in FIG. 10 in accordance with an embodiment of the present invention. In this particular example, FIG. 10A illustrates representative results for 3 different types of loan products that the consumer desires and as designated in the consumer profile, namely a 3 year fully amortizing ARM, a 5 year interest only ARM, and a 30 year fully amortizing fixed mortgage.

FIG. 10B—part2 shows a portion of the entire consumer profile ("Your Profile Assumptions"), and in this example the consumer's desired loan-to-value (LTV) ratio is shown to be 100%. Therefore the qualification engine and programming logic matches this consumer need along with all other qualifications and needs to a ranking of the best available loan products with associated rate pricing. In this example, the search determines the best available loan products to be a single mortgage at 100% LTV as well as a combination of mortgages for the 3 year fully amortizing ARM. In the "multiple mortgages" (also know as "combo" mortgage) scenarios, the consumer may be able to obtain the best available loan product and associated rate pricing by assuming two loans instead of one. In some cases the multiple mortgages may be provided from a single lender while in others, the consumer may obtain the best available loan product by receiving one mortgage from one lender and the second or additional mortgages from a different lender or lenders.

In this scenario, the consumer is unable to obtain a better loan product with a combination of loans from the "5 year ARM, Interest Only" (FIG. 10A) and "30 year fixed, Fully Amortizing" (FIG. 10B—part1) loan products. This fact is evident because no minimum initial monthly payment or Annual Percentage Rate (APR) is lower than that which is available for a singular or combination of "3 year ARM, Fully Amortizing" (FIG. 10A) loan products.

FIG. 10C shows an example of a typical legal disclaimer, and FIG. 10D shows a representative example of a Good Faith Estimate of the closing costs and fees involved in obtaining a loan. The title insurance cost or other closing costs and fees may be automatically determined or calculated utilizing predetermined formulae, data stored in the loan broker lender database 585, or through communication with lender servers 10 over the network 40, and these costs are listed as a portion of the consumer output.

This invention allows individual consumers to conduct a customized search of lenders and their loan products for the best mortgage including lowest rate, and lowest monthly payment, Annual Percentage Rate (APR), and/or closing costs and fees based on their needs and personal profile. Based on that information which consumers provide or which is obtained through alternative methods, programming logic creates personalized loan profiles based on consumers' financial and product information and stores those profiles in a database. Information in the form of lending criteria and guidelines is obtained from lenders and entered into a standardized, searchable database format. Programming logic has been invented which performs data interpretation, entry and maintenance of each lender's guidelines—including aggregation and presentation of wholesale and retail loan product rates—since all lender information is not individually presented in a single, standardized format. While rate matrices are often presented in similar formats, there has been no standard way of presenting exceptions, yield spread pricing adjustments, rate add-ons, and product and credit standards.

This invention creates that standardization such that the consumer profiles can then be matched against the lenders' underwriting guidelines to optimize product and pricing for the consumer. The novel search format is also able to account for the numerous exceptions, pricing adjustments, and rate add-ons that can apply to lenders' underwriting guidelines. The invention is able to rank the available loan products according to the desired criteria: rate, monthly payment, Annual Percentage Rate, and associated fees and closing costs. Consumers may then be informed as to exactly which lender or lenders will provide them with the optimal loan product or combination of loan products based on that customer profile.

The invention provides several advantages compared to current related technologies, although all advantages are not necessarily present in every embodiment of the invention. The customized search engine provides complete transparency into the loan process by presenting the information required to find the best available loan product at the lowest rate, monthly payment, Annual Percentage Rate (APR), and associated fees and closing costs. This invention is not limited solely to home mortgages, and in addition to obtaining the best available loan product, the consumer's direct search potentially enables avoidance of the traditional loan broker process and associated fees. Furthermore, because of the direct link established by the network between consumers and lenders, the loan broker server(s) allow lenders to find consumers just as easily and efficiently as the consumers are now able to find the lenders and the associated loan products. Additional and alternative data is also available from the credit bureau and alternative data server(s) or device(s) to provide more information faster or automatically to improve or facilitate the search for as well as matching of the best available loan products and consumers. With this newfound efficiency and transparency, transaction costs and overall costs are also reduced. Once the best available loan products have been selected, consumers may initiate and complete loan transactions for one or more of the loan products with any of a plurality of lending institutions (after step k of FIG. 9).

Foregoing described embodiments of the invention are provided as illustrations and descriptions. They are not intended to limit the invention to the precise form described. Other variations and embodiments are possible in light of above teachings, and it is thus intended that the scope of invention not be limited by this Detailed Description, but rather by the following claims.

What is claimed is:

1. A computer-accessible medium having encoded thereon instructions to present a consumer with available loan products with associated pricing, wherein the instructions, when executed by a computing apparatus, cause the computing apparatus to:
    compare the consumer profile to at least one of existing lender guideline criteria and combined criteria of a plurality of lenders;
    reject lenders that will not offer loan products to the consumer;
    compare the consumer profile to available lender loan products;
    obtain a number of available loan products;
    at least one of calculating or determining base rate and yield spread rate for the available loan products wherein determining the base rate and yield spread rate further comprises creating a pricing matrix within a lender database and increase or decrease the rate pricing of a loan product based on predefined criteria to calculate or determine lender rates for the loan product; and,
    rank and present the loan products according to interest rate, monthly payment, or annual percentage rate (APR) or other output in an interactive interface.

2. The computer-accessible medium of claim 1, wherein the combined criteria of the said plurality of lenders further comprises combining and optimizing product selection according to the consumer profile to include multiple weighted products from different lending institutions.

3. The computer-accessible medium of claim 1, wherein the instructions further automatically calculate consumer output criteria comprising lenders, loan products, rates, monthly payment totals, annual percentage rate (APR), lender fees, or a portion of the consumer profile.

4. The computer-accessible medium of claim 1, wherein the instructions further automatically calculate consumer output criteria comprising title insurance cost, lender fees, or other closing costs and fees.

5. The computer-accessible medium of claim 1, wherein the instructions further allow the consumer to modify their existing consumer profile to obtain alternative lending institutions' product rankings based on alternative search criteria.

6. The computer-accessible medium of claim 1, wherein the instructions further allow a computing apparatus to communicate with other computer devices to obtain additional information or to allow a consumer to contact the lender or initiate or complete a transaction for one or more of the loan products as presented in the consumer output.

7. The computer accessible medium of claim 1 wherein said number of available loan products obtained comprise a combination of a plurality of available loan products which offer a combination of loans, providing a combined loan, or a combination of loans, with overall lowest monthly payments, interest rates, annual percentage rate (APR), lender fees or overall lowest blended monthly payments, interest rates or annual percentage rate (APR) or lender fees.

8. The combination of a plurality of available loan products of claim 7 wherein said combination product is obtained from a single lending institution.

9. The combination of a plurality of available loan products of claim 7 wherein said combination product is obtained from a plurality of lending institutions.

10. The method of claim 1 wherein said number of available loan products obtained comprise single loan products with the corresponding monthly payments, interest rates, annual percentage rate (APR) or lender fees.

11. The available loan products of claim 10, wherein said available loan product is a new first loan, deed of trust, or mortgage with an existing second loan, deed of trust, or mortgage remaining in place.

12. The available loan products of claim 10, wherein said available loan product is a new second mortgage, loan, deed of trust, or line of credit with an existing first loan, deed of trust, or mortgage remaining in place.

* * * * *

UNITED STATES PATENT AND TRADEMARK OFFICE
CERTIFICATE OF CORRECTION

| | | |
|---|---|---|
| PATENT NO. | : 7,970,699 B1 | Page 1 of 1 |
| APPLICATION NO. | : 11/390805 | |
| DATED | : June 28, 2011 | |
| INVENTOR(S) | : William Bramlage et al. | |

It is certified that error appears in the above-identified patent and that said Letters Patent is hereby corrected as shown below:

Sheet 9, Figure 9 - should read "a complete connecting line from step g to step gg."

Page 22, column 14, line 4 - should read "gains" instead of "gain".

Page 22, column 14, line 17 - should read "or" instead of "ir".

Signed and Sealed this
Twenty-first Day of August, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,970,699 B1 | Page 1 of 2 |
| APPLICATION NO. | : 11/390805 | |
| DATED | : June 28, 2011 | |
| INVENTOR(S) | : William Bramlage et al. | |

It is certified that error appears in the above-identified patent and that said Letters Patent is hereby corrected as shown below:

In the Drawings:

Sheet 9, Figure 9 - should read "a complete connecting line from step g to step gg." as shown on attached drawing sheet.

In the Specifications:

Page 22, column 14, line 4 - should read "gains" instead of "gain".

Page 22, column 14, line 17 - should read "or" instead of "ir".

This certificate supersedes the Certificate of Correction issued August 21, 2012.

Signed and Sealed this
Twenty-third Day of July, 2013

Teresa Stanek Rea
*Acting Director of the United States Patent and Trademark Office*

Process Flow Logic